(12) United States Patent
Hara et al.

(10) Patent No.: US 11,377,137 B2
(45) Date of Patent: Jul. 5, 2022

(54) ELECTRIC DRIVE DEVICE AND ELECTRIC POWER STEERING DEVICE

(71) Applicant: HITACHI AUTOMOTIVE SYSTEMS, LTD., Hitachinaka (JP)

(72) Inventors: Hideyuki Hara, Isesaki (JP); Haruaki Motoda, Isesaki (JP); Kazuhiko Nakano, Isesaki (JP); Katsumasa Hagiwara, Isesaki (JP); Tetsuro Tateyama, Isesaki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 172 days.

(21) Appl. No.: 16/626,702

(22) PCT Filed: Mar. 7, 2018

(86) PCT No.: PCT/JP2018/008700
§ 371 (c)(1),
(2) Date: Dec. 26, 2019

(87) PCT Pub. No.: WO2019/003501
PCT Pub. Date: Jan. 3, 2019

(65) Prior Publication Data
US 2020/0156696 A1    May 21, 2020

(30) Foreign Application Priority Data

Jun. 28, 2017 (JP) .............................. JP2017-126136

(51) Int. Cl.
*B62D 5/04* (2006.01)
*H02K 11/33* (2016.01)
*B62D 6/10* (2006.01)

(52) U.S. Cl.
CPC .......... *B62D 5/0409* (2013.01); *B62D 5/0406* (2013.01); *B62D 5/0463* (2013.01);
(Continued)

(58) Field of Classification Search
CPC ... B62D 5/0409; B62D 5/0406; B62D 5/0463
See application file for complete search history.

(56) References Cited

U.S. PATENT DOCUMENTS

| 6,313,624 B1 | 11/2001 | Alhorn et al. |
| 9,729,028 B2 * | 8/2017 | Akutsu ................. H02K 5/15 |

(Continued)

FOREIGN PATENT DOCUMENTS

| DE | 11 2018 004 990 T5 | 6/2020 |
| JP | S55-98153 U | 7/1980 |

(Continued)

OTHER PUBLICATIONS

U.S. Appl. No. 16/620,781, filed Dec. 9, 2019, Tateyama.
(Continued)

*Primary Examiner* — Tony H Winner
(74) *Attorney, Agent, or Firm* — Foley & Lardner LLP

(57) ABSTRACT

The device has motor housing side annular engagement portion 40 formed at outer circumferential surface of end surface portion of motor housing 11 which is opposite side to output shaft portion of rotation shaft of electric motor; and metal cover side annular engagement portion 38 formed at opening end 37 of metal cover 12 that covers electronic control unit and engaged with motor housing side annular engagement portion 40. Fixing region is formed by fixing metal cover side annular engagement portion 38 to motor housing side annular engagement portion 40 in a fixing manner without using any fixing screw in a state in which metal cover side annular engagement portion 38 is engaged with motor housing side annular engagement portion 40. Sealing region is formed between fixing region and opening end 37 of the metal cover 12 with liquid sealant 41 applied between fixing region and opening end 37.

18 Claims, 15 Drawing Sheets

(52) U.S. Cl.
CPC .............. *B62D 6/10* (2013.01); *H02K 11/33* (2016.01); *B62D 5/0484* (2013.01)

(56) References Cited

U.S. PATENT DOCUMENTS

| | | | |
|---|---|---|---|
| 10,050,493 B2* | 8/2018 | Kabune | B62D 5/0412 |
| 10,668,944 B2* | 6/2020 | Fujimoto | H02K 11/33 |
| 10,710,628 B2* | 7/2020 | Asao | H02K 5/18 |
| 11,096,268 B2* | 8/2021 | Goatley | H05K 7/1432 |
| 2005/0116335 A1 | 6/2005 | Karim | |
| 2005/0167183 A1 | 8/2005 | Tominaga et al. | |
| 2008/0277189 A1 | 11/2008 | Kanda et al. | |
| 2013/0062137 A1 | 3/2013 | Motoda | |
| 2014/0202781 A1 | 7/2014 | Soma et al. | |
| 2015/0171709 A1* | 6/2015 | Ito | H02K 9/22 310/52 |
| 2015/0180316 A1 | 6/2015 | Maeshima | |
| 2018/0127020 A1 | 5/2018 | Asao et al. | |
| 2018/0248451 A1 | 8/2018 | Hagiwara | |
| 2019/0300047 A1 | 10/2019 | Hamada | |

FOREIGN PATENT DOCUMENTS

| | | | |
|---|---|---|---|
| JP | H8-163810 A | | 6/1996 |
| JP | 2014-187760 | * | 10/2014 |
| JP | 2014-187760 A | | 10/2014 |
| JP | 2015-134598 A | | 7/2015 |
| WO | WO-2018/230211 A | | 12/2018 |
| WO | WO-2019/012792 A1 | | 1/2019 |
| WO | WO-2019/016999 A1 | | 1/2019 |

OTHER PUBLICATIONS

U.S. Appl. No. 16/628,580, filed Jan. 3, 2020, Hagiwara.
International Search Report dated May 22, 2018 in International Application No. PCT/JP2018/008700.
Written Opinion of the International Searching Authority dated May 22, 2018 in International Application No. PCT/JP2018/008700.
Notice of Allowance on U.S. Appl. No. 16/628,580 dated Apr. 29, 2020.
Non-Final Office Action on U.S. Appl. No. 16/620,781 dated May 18, 2022.

* cited by examiner

ELECTRIC DRIVE DEVICE AND ELECTRIC POWER STEERING DEVICE

TECHNICAL FIELD

The present invention relates to an electric drive device and an electric power steering device, and more particularly to an electric drive device and an electric power steering device in which an electronic control device is mounted.

BACKGROUND ART

In a field of general industrial equipment, a mechanical control element is driven by an electric motor. In recent years, so-called electrically mechanically integrated electric drive device, which is configured such that an electronic control unit formed from a semiconductor element etc. controlling a rotation speed and/or a rotation torque of the electric motor is integrally mounted in the electric motor, has been used.

As an example of the electrically mechanically integrated electric drive device, for instance, an electric power steering device is configured such that a turning direction and a turning torque of a steering shaft that turns by driver's operation of a steering wheel are detected, and on the basis of these detection values, the electric motor is driven so as to rotate in the same direction as the turning direction of the steering shaft, then a steering assist torque is generated. To control this electric motor, the power steering device is provided with an electronic control unit (ECU: Electronic Control Unit).

As a related art electric power steering device, for instance, an electric power steering device disclosed in Japanese Unexamined Patent Application Publication No. 2015-134598 (Patent Document 1) is known. Patent Document 1 discloses the electric power steering device configured by an electric motor unit and an electronic control unit. An electric motor of the electric motor unit is housed in a motor housing having a cylindrical portion made of aluminum alloy etc. A board of the electronic control unit on which electronic elements or components are mounted is fixed to a heat sink that is located at an opposite side to an output shaft of the electric motor in an axial direction of the motor housing and serves as an ECU housing.

The board fixed to the heat sink mounts thereon a power supply circuit unit, a power conversion circuit unit having a power switching element such as a MOSFET and an IGBT that drive and control the electric motor, and a control circuit unit that controls the power switching element. An output terminal of the power switching element and an input terminal of the electric motor are electrically connected through a bus bar.

Power is supplied to the electronic control unit fixed to the heat sink from a power supply through a connector case made of synthetic resin. Further, detection signals concerning an operating state etc. are sent to the electronic control unit from detection sensors. The connector case functions as a lid member or a cover member, and is fixed to an outer peripheral surface of the heat sink with a fixing screw so as to hermetically seal the heat sink.

As another electric drive device in which the electronic control device is integrally mounted, an electric brake and an electric hydraulic pressure controller for various kinds of hydraulic pressure control are known. In the following description, the electric power steering device from among these electric drive devices will be explained.

CITATION LIST

Patent Document

Patent Document 1: Japanese Unexamined Patent Application Publication No. 2015-134598

SUMMARY OF THE INVENTION

Technical Problem

In a case of the configuration of the electric power steering device disclosed in Patent Document 1, the motor housing, the heat sink and the connector case are connected to each other with fixing screws inserted and screwed into fixing portions that are formed at respective outer peripheral sides of the motor housing, the heat sink and the connector case so as to protrude outwards.

Further, sealing members such as an O-ring to ensure liquid-tightness are used between the motor housing and the heat sink and between the heat sink and the connector case. As mentioned above, the motor housing and the heat sink, and the heat sink and the connector case, are connected with the fixing screws. Here, in a case where the heat sink is not used, the motor housing and the connector case are connected with the fixing screws with the O-ring interposed between the motor housing and the connector case.

Here, vehicles are also used in a region where the vehicles severely suffer from salt damage. In a case of a liquid tightness sealing structure by only the O-ring, however, a fitting gap substantially appears in an area where the O-ring is provided. Because of this, there is a possibility that salt water will get in this fitting gap and will rust an O-ring accommodating portion. Further, at the worst, this causes poor liquid tightness, and the salt water further gets inside, then there is a risk that electrical reliability will be lost.

In addition, when the fixing portions and the fixing screws are provided at the outer peripheral sides of the motor housing, the heat sink and the connector case, there is a risk that mechanical reliability will be lost due to reduction in a fixing strength by rust of the fixing screw. And also, this configuration has a problem of increasing an outward appearance size and a weight.

Therefore, an electric drive device and an electric power steering device that are capable of resolving these problems are required.

Additionally, in the electric power steering device disclosed in Patent Document 1, the heat sink to release heat of, especially, the power supply circuit unit and the power conversion circuit unit is arranged between the motor housing and the ECU housing. For this reason, a length in an axial direction tends to become longer by a size of the heat sink. Further, since an electrical component forming the power supply circuit unit and the power conversion circuit unit has a large heat value, when achieving size reduction, this heat has to be efficiently radiated or released to the outside. Accordingly, it is required for the axial direction length of the electric drive device to be as short as possible, and also it is required for the heat of the power supply circuit unit and the power conversion circuit unit to be efficiently radiated or released to the outside.

A main object of the present invention is therefore to provide a new electric drive device and a new electric power steering device that are capable of improving the mechanical and electrical reliability and reducing the outward appearance size and the weight.

Solution to Problem

The present invention has, as features, a motor housing side annular engagement portion formed on an outer circumferential surface of an end surface portion of a metal-made motor housing which is an opposite side to an output shaft portion of a rotation shaft of an electric motor; and a metal cover side annular engagement portion formed at an opening end of a metal cover that covers an electronic control unit configured to control the electric motor and engaged with the motor housing side annular engagement portion, and a fixing region is formed by fixing the metal cover side annular engagement portion to the motor housing side annular engagement portion in a fixing manner without using any fixing screw in a state in which the metal cover side annular engagement portion is engaged with the motor housing side annular engagement portion, and a sealing region is formed between the fixing region and the opening end of the metal cover with a liquid sealant applied between the fixing region and the opening end of the metal cover.

Effects of Invention

According to the present invention, since the sealing region is formed between the fixing region and the opening end of the metal cover with the liquid sealant applied between the fixing region and the opening end of the metal cover, salt water etc. are prevented from getting in the fixing region, then mechanical and electrical reliability can be improved. Further, since the fixing screw is not used, it is possible to reduce an outward appearance size and a weight.

EMBODIMENTS FOR CARRYING OUT THE INVENTION

An embodiment of the present invention will be explained in detail below with reference to the drawings. The present invention is not limited to the following embodiment, and includes all design modifications and equivalents belonging to the technical scope of the present invention.

Figure 1:
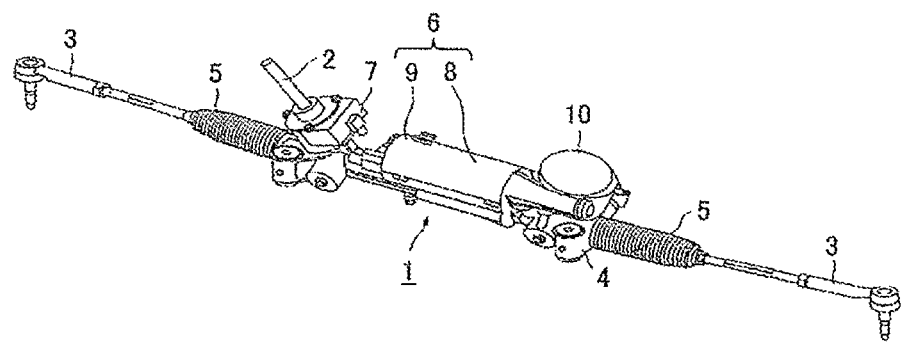
FIG. 1 is a general perspective view of a steering device as an example to which the present invention is applied.

Before explaining the embodiment of the present invention, a configuration of a steering device as an example to which the present invention is applied will be briefly explained using FIG. 1.

First, a steering device to steer front wheels of a vehicle will be explained. A steering device 1 is configured as shown in FIG. 1. A pinion (not shown) is provided at a lower end of a steering shaft 2 connecting to a steering wheel (not shown). This pinion is engaged with a rack (not shown) that extends in right and left directions of a vehicle body. A tie rod 3 to steer the front wheels in the right and left directions is each connected to both ends of the rack. The rack is accommodated in a rack housing 4. Between the rack housing 4 and each tie rod 3, a rubber boot 5 is provided.

The steering device 1 is provided with an electric power steering device 6 to assist torque when performing a turning operation of the steering wheel. That is, a torque sensor 7 that detects a turning direction and a turning torque of the steering shaft 2 is provided. And, an electric motor unit 8 that provides a steering assistive force to the rack via a gear 10 on the basis of a detection value of the torque sensor 7 is provided. Further, an electronic control unit (ECU) 9 that controls an electric motor disposed in the electric motor unit 8 is provided. The electric motor unit 8 of the electric power steering device 6 is connected to the gear 10 at three portions of an outer periphery at an output shaft side of the electric motor unit 8 with screws (not shown). The electronic control unit 9 is disposed on an opposite side to the output shaft side of the electric motor unit 8.

In the electric power steering device 6, when the steering shaft 2 is turned in any turning direction by the steering wheel operation, the torque sensor 7 detects the turning direction and the turning torque of the steering shaft 2. A control circuit unit calculates a drive operation amount of the electric motor on the basis of these detection values. The electric motor is then driven by a power switching element of a power conversion circuit unit on the basis of the calculated drive operation amount. And, an output shaft of the electric motor rotates so as to drive and rotate the steering shaft 2 in the same direction as a direction of the steering wheel operation. This rotation of the output shaft of the electric motor is transmitted to the rack (not shown) through the pinion (not shown) and the gear 10, and the vehicle is steered. Since such configuration and workings are well known, a further explanation will be omitted here.

As mentioned above, vehicles are also used in the region where the vehicles severely suffer from salt damage, and in the case of the liquid tightness sealing structure by only the O-ring like the electric power steering device having the configuration disclosed in Patent Document 1, the fitting gap substantially appears in the area where the O-ring is provided. Because of this, there is a possibility that salt water will get in this fitting gap and will rust the O-ring accommodating portion. Further, at the worst, this causes poor liquid tightness, and the salt water further gets inside, then there is a risk that electrical reliability will be lost.

In addition, when the fixing portions and the fixing screws are provided at the outer peripheral sides of the motor housing, the heat sink and the connector case, there is a risk that mechanical reliability will be lost due to reduction in a fixing strength by rust of the fixing screw. And also, this configuration has a problem of increasing an outward appearance size and a weight.

From such background, the present embodiment proposes the electric power steering device having the following configuration.

First Embodiment

In the present embodiment, the electric power steering device has a motor housing side annular engagement portion formed on an outer circumferential surface of an end surface portion of a metal-made motor housing which is an opposite side to an output shaft portion of a rotation shaft of an electric motor; and a metal cover side annular engagement portion formed at an opening end of a metal cover that covers an electronic control unit configured to control the electric motor and engaged with the motor housing side annular engagement portion. And, a fixing region is formed by fixing the metal cover side annular engagement portion to the motor housing side annular engagement portion in a fixing manner without using any fixing screw in a state in which the metal cover side annular engagement portion is engaged with the motor housing side annular engagement portion, and a sealing region is formed between the fixing region and the opening end of the metal cover with a liquid sealant applied between the fixing region and the opening end of the metal cover.

According to the above configuration, since the sealing region is formed between the fixing region and the opening end of the metal cover with the liquid sealant applied between the fixing region and the opening end of the metal cover, salt water etc. are prevented from getting in the fixing region, then mechanical and electrical reliability can be improved. Further, since the fixing screw is not used, it is possible to reduce an outward appearance size and a weight. In addition, in a case where an O-ring is used, it is required to form an accommodating groove for accommodating the O-ring. However, in the present embodiment, since the O-ring is not used, no machining for the accommodating groove is required, and this can suppress increase in manufacturing cost.

In the following description, a configuration of the electric power steering device according to a first embodiment of the present invention will be explained in detail with reference to FIGS. 2 to 14.

Figure 2:
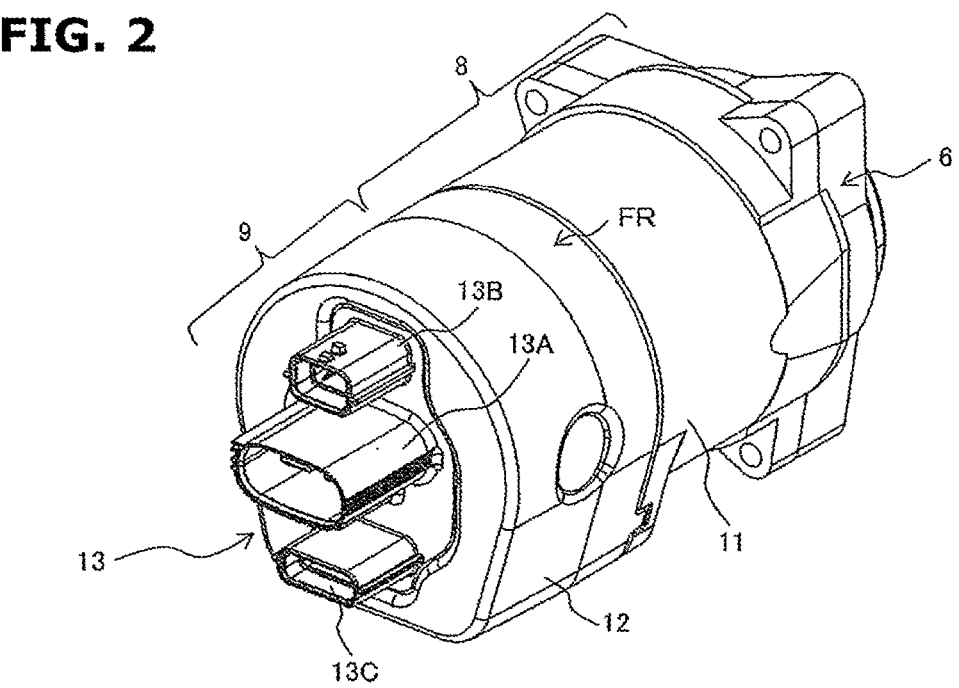
FIG. 2 is a general perspective view of an electric power steering device according to an embodiment of the present invention.
Figure 3:
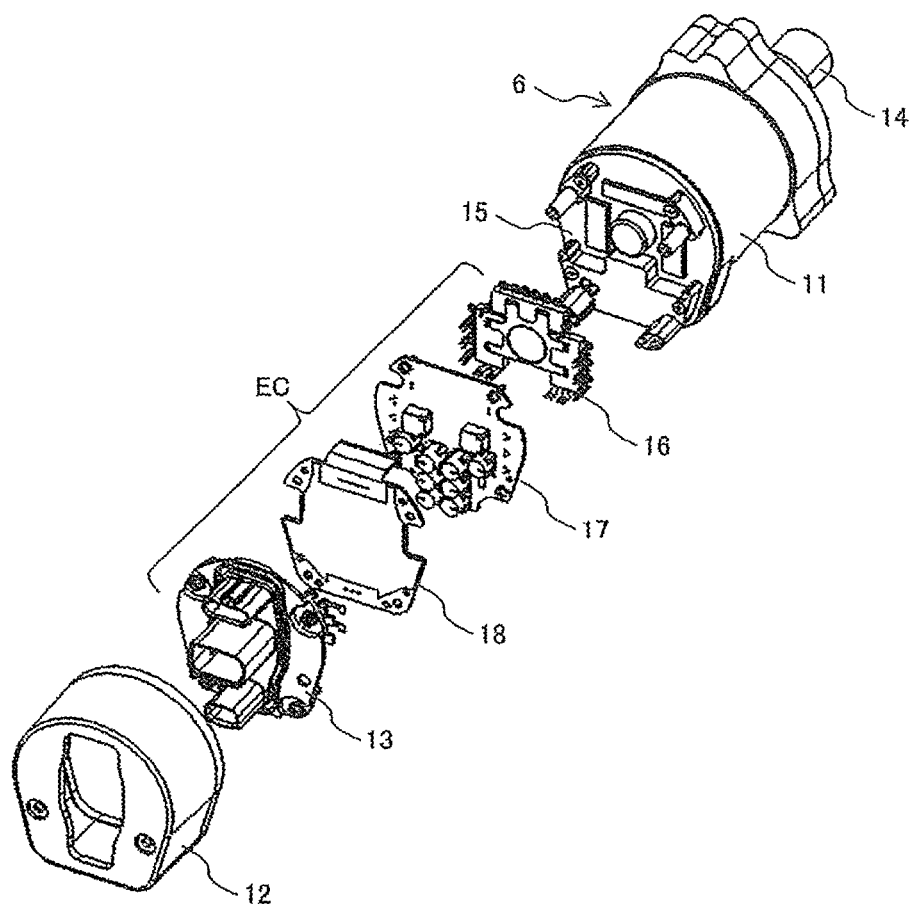
FIG. 3 is a perspective exploded view of the electric power steering device shown in FIG. 2.

FIG. 2 is a drawing showing a general configuration of the electric power steering device according to the present embodiment. FIG. 3 is a drawing, viewed from an oblique direction, with components of the electric power steering device shown in FIG. 2 dismantled. FIGS. 4 to 9 are drawings showing assembly states of components that are assembled in an assembly order.

Figure 10:
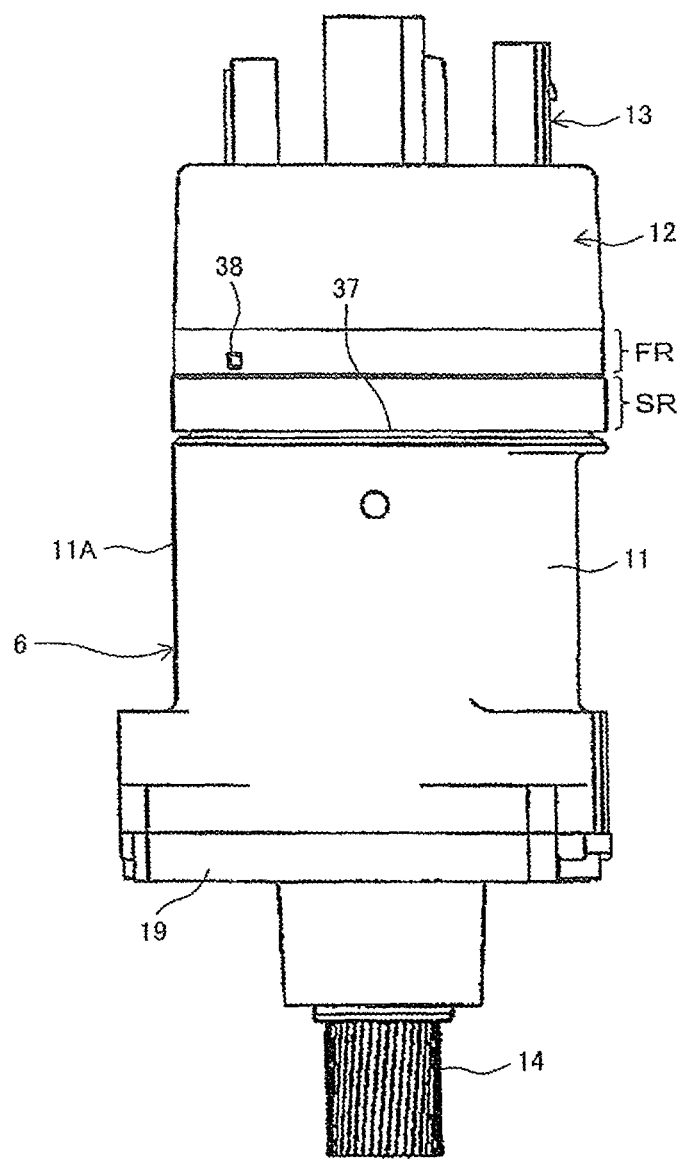
FIG. 10 is a front view of the electric power steering device after a caulking or swaging fixation is performed, according to a first embodiment of the present invention.
Figure 11:
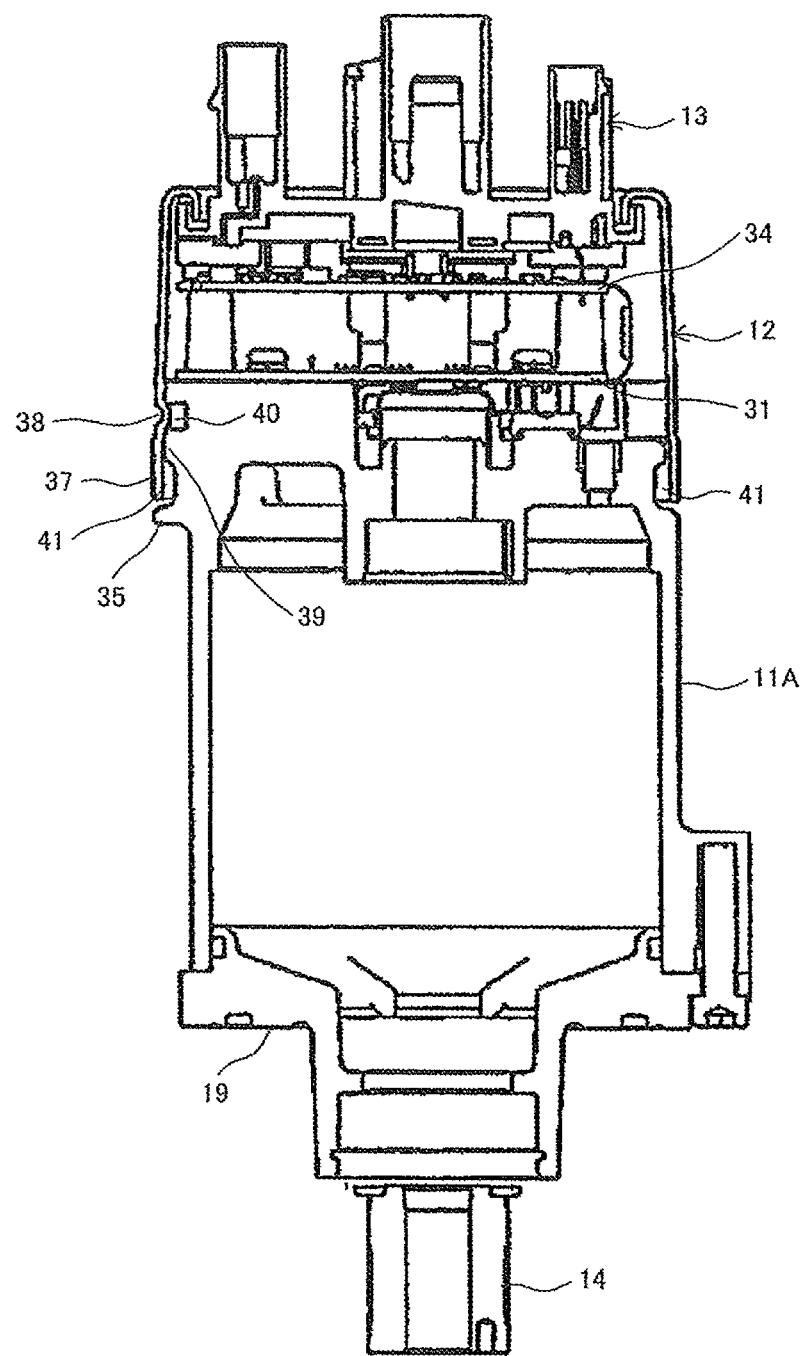
FIG. 11 is a cross section of the electric power steering device shown in FIG. 10 after the caulking or swaging fixation is performed.
Figure 12:
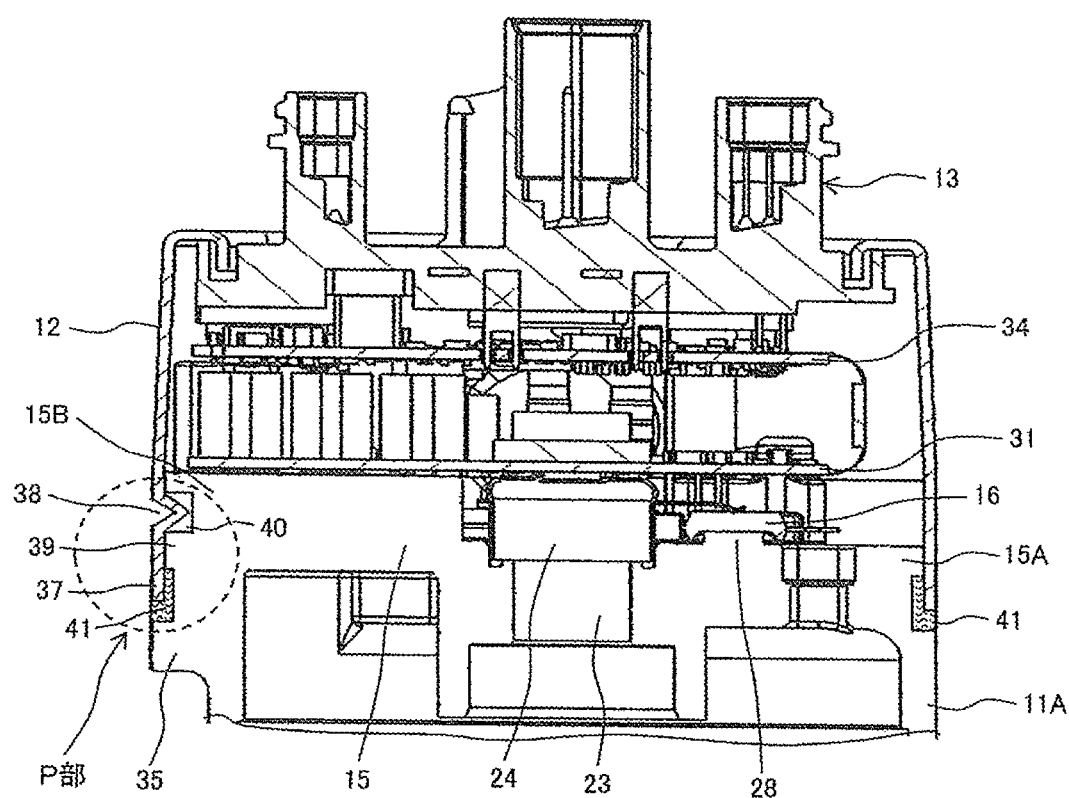
FIG. 12 is an enlarged local sectional view, cut in the axial direction, of an engagement portion between the motor housing and a metal cover and its vicinity after the caulking or swaging fixation is performed.
Figure 13:
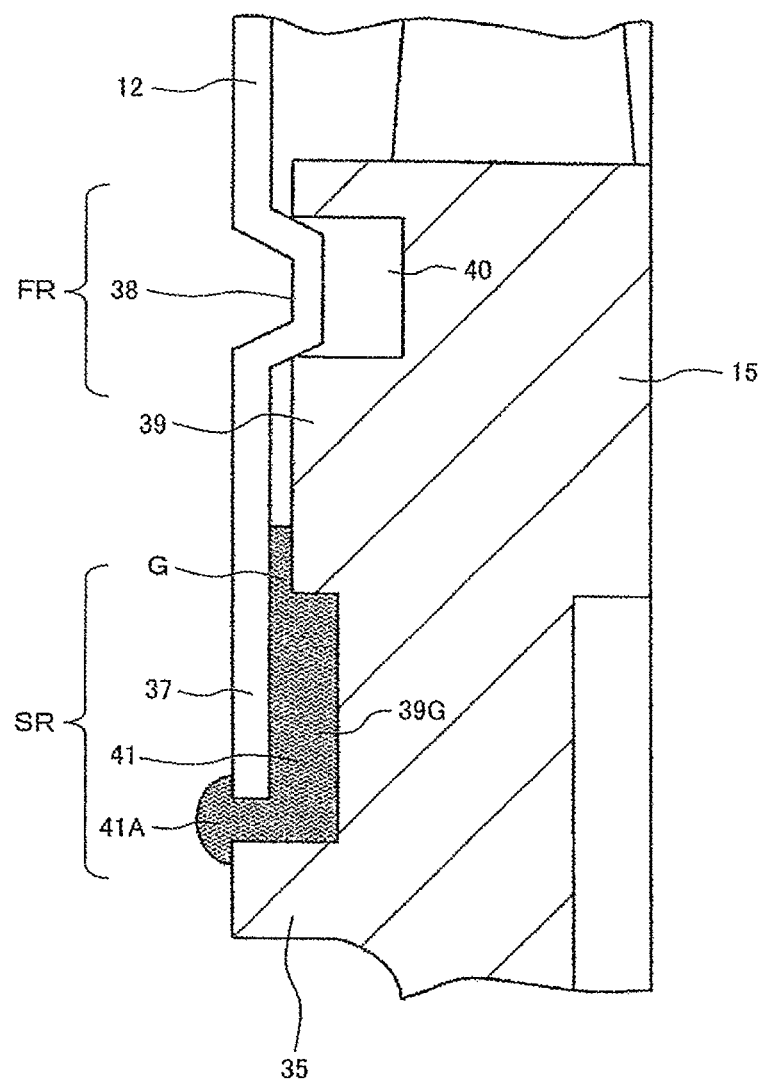
FIG. 13 is an enlarged view of a part P of FIG. 12.
Figure 14:
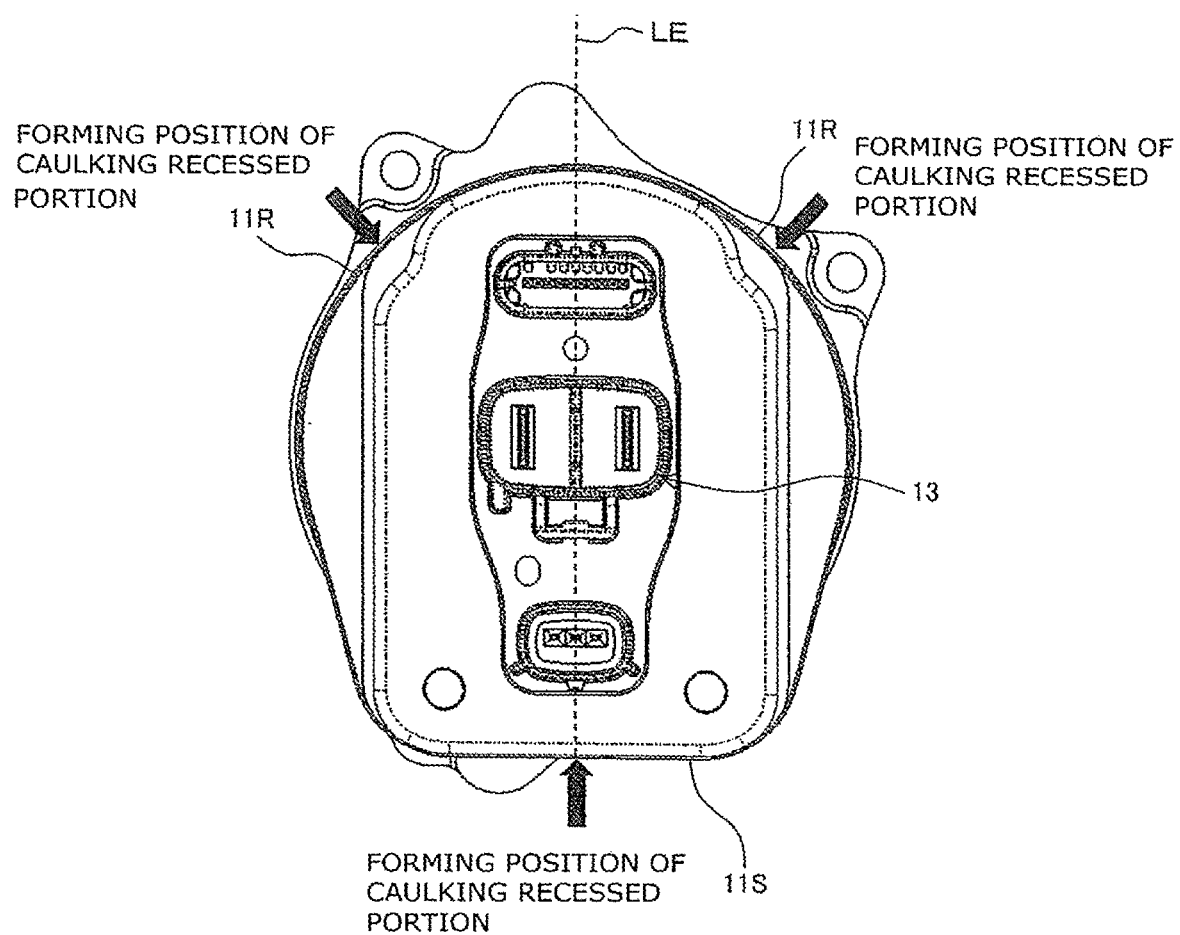
FIG. 14 is a top view, viewed from the connector terminal assembly side, of the electric power steering device shown in FIG. 12.

FIG. 10 is a drawing showing the whole of the electric power steering device after a caulking or swaging fixation is performed. FIG. 11 is a cross section of the electric power steering device after the caulking or swaging fixation is performed. FIG. 12 is a sectional view, cut in an axial direction, of an engagement portion between a motor housing and a metal cover and its vicinity. FIG. 13 is an enlarged sectional view of a caulk-fixing portion (or a swage-fixing portion) FIG. 14 is a drawing showing the metal cover, viewed from a connector side. The embodiment will be explained below with reference to the drawings.

As shown in FIG. 2, an electric motor unit 8 forming the electric power steering device is configured by a motor housing 11 having a cylindrical portion made of aluminum or aluminum-based metal such as aluminum alloy and an electric motor (not shown) accommodated in the motor housing 11. An electronic control unit 9 is configured by a metal cover 12 made of aluminum, aluminum-based metal such as aluminum alloy or iron-based metal and located at an opposite side to an output shaft of the electric motor in an axial direction of the motor housing 11 and an electronic control assembly (not shown) accommodated in this metal cover 12.

The motor housing 11 and the metal cover 12 are fixedly connected to each other at a fixing region FR that is formed at their opposing end surfaces in an outer circumferential direction by an after-described "caulking or swaging fixation". The electronic control assembly accommodated inside the metal cover 12 is configured by a power supply circuit unit that generates a required power, a power conversion circuit unit having a power switching element such as a MOSFET and an IGBT that drive and control the electric motor of the electric motor unit 8, and a control circuit unit that controls the power switching element. An output terminal of the power switching element and an input terminal of a coil of the electric motor are electrically connected through a bus bar.

A connector terminal assembly 13 is exposed from a hole portion formed at an end surface, which is located at an opposite side to the motor housing 11, of the metal cover 12. The connector terminal assembly 13 is fixed to fixing portions formed at the motor housing 11 with fixing screws. The connector terminal assembly 13 has a connector terminal forming portion 13A for power supply, a connector terminal forming portion 13B for detection sensors, and a connector terminal forming portion 13C for control state output by which a control state is outputted to an external device.

The electronic control assembly accommodated in the metal cover 12 is supplied with power from a power supply through the synthetic-resin-made connector terminal forming portion 13A for power supply. Further, the electronic control assembly is provided with detection signals of an operating condition etc from the detection sensors through the connector terminal forming portion 13B for detection sensors. A current control state signal of the electric power steering device is outputted from the electronic control assembly through the connector terminal forming portion 13C for control state output.

FIG. 3 is a perspective exploded view of the electric power steering device 6. An iron-made annular side yoke (not shown) is fitted to an inside of a motor housing 11. The electric motor is accommodated inside this side yoke. An output shaft portion 14 of the electric motor provides the steering assistive force to the rack via the gear. Since a specific structure of the electric motor is well known, its explanation will be omitted here.

The motor housing 11 is made of aluminum alloy, and acts as a heat sink that radiates or releases heat generated at the electric motor and heat generated in after-mentioned power supply circuit unit and power conversion circuit unit to the outside atmosphere. The electric motor and the motor housing 11 form the electric motor unit 8.

An electronic control unit EC is connected to an end surface portion 15 of the motor housing 11 which is an opposite side to the output shaft portion 14 of the electric motor unit 8. The electronic control unit EC has the power conversion circuit unit 16, the power supply circuit unit 17, the control circuit unit 18 and the connector terminal assembly 13. The end surface portion 15 of the motor housing 11 is formed integrally with the motor housing 11. However, the end surface portion 15 could be formed separately from the motor housing 11, then fixed to the motor housing 11 with screws or by welding.

Here, the power conversion circuit unit 16, the power supply circuit unit 17 and the control circuit unit 18 form a redundant system (a dual-redundancy system) by a main electronic control unit and a sub-electronic control unit. In a normal condition, the electric motor is driven and controlled by the main electronic control unit. However, if an abnormal condition or a failure occurs at the main electronic control unit, the control is switched to the sub-electronic control unit, and the electric motor is driven and controlled by the sub-electronic control unit.

Therefore, normally, heat from the main electronic control unit is transmitted to the motor housing 11. If the abnormal condition or the failure occurs at the main electronic control unit, the main electronic control unit stops and the sub-electronic control unit operates, then heat from the sub-electronic control unit is transmitted to the motor housing 11. These will be described later.

However, both of the main electronic control unit and the sub-electronic control unit could operate as a regular electronic control unit, although the present invention does not apply this configuration. And, if the abnormal condition or the failure occurs at one of the electronic control units, the other electronic control unit drives and controls the electric motor by half ability. In this case, although capability of the electric motor is half, so-called limp-home function is secured. Therefore, in the normal condition, heat from the main electronic control unit and the sub-electronic control unit is transmitted to the motor housing 11.

The electronic control unit EC is configured by the power conversion circuit unit 16, the power supply circuit unit 17, the control circuit unit 18 and the connector terminal assembly 13. These power conversion circuit unit 16, power supply circuit unit 17, control circuit unit 18 and connector terminal assembly 13 are arranged in this order from the end surface portion 15 side to a direction moving away from the end surface portion 15. The control circuit unit 18 is a unit that generates a control signal for driving the switching element of the power conversion circuit unit 16, and is configured by a microcomputer and a peripheral circuit and so on. The power supply circuit unit 17 is a unit that generates power to drive the control circuit unit 18 and power for the power conversion circuit unit 16, and is configured by a capacitor, a coil and a switching element and so on. The power conversion circuit unit 16 is a unit that controls power (current) flowing in the coil of the electric motor, and is configured by a switching element that forms three-phase upper and lower arms and so on.

A unit having a large heat value in the electronic control unit EC is mainly the power conversion circuit unit 16 and the power supply circuit unit 17. Heat of the power conversion circuit unit 16 and the power supply circuit unit 17 is released from the motor housing 11 made of aluminum alloy. This detailed structure or configuration will be described with reference to FIGS. 4 to 9 later.

The synthetic-resin-made connector terminal assembly 13 is arranged between the control circuit unit 18 and the metal cover 12, and is connected to a vehicle battery (the power supply) and other external control device (not shown). Needless to say, the connector terminal assembly 13 is connected to the power conversion circuit unit 16, the power supply circuit unit 17 and the control circuit unit 18.

The metal cover 12 has a function of accommodating and liquid-tightly sealing the power conversion circuit unit 16, the power supply circuit unit 17 and the control circuit unit 18. In the present embodiment, the metal cover 12 is fixed to the motor housing 11 by the caulking or swaging fixation.

Although details about this caulking or swaging fixation of the metal cover 12 to the motor housing 11 is explained later, a motor housing side annular engagement portion and a metal cover side annular engagement portion formed at an opening end of the metal cover 12 and engaged with the motor housing side annular engagement portion are formed. And, a fixing region is formed by fixing the metal cover side annular engagement portion to the motor housing side annular engagement portion by caulking or swaging fixation (which is a fixing manner without using any fixing screw) in a state in which the metal cover side annular engagement portion is engaged with the motor housing side annular engagement portion, and a sealing region is formed between the fixing region and the opening end of the metal cover with a liquid sealant applied between the fixing region and the opening end of the metal cover.

According to this configuration, since the sealing region is formed between the fixing region and the opening end of the metal cover with the liquid sealant applied between the fixing region and the opening end of the metal cover, salt water etc. are prevented from getting in the fixing region, then mechanical and electrical reliability can be improved. Further, since the fixing screw is not used, it is possible to reduce an outward appearance size and a weight.

Figure 4:
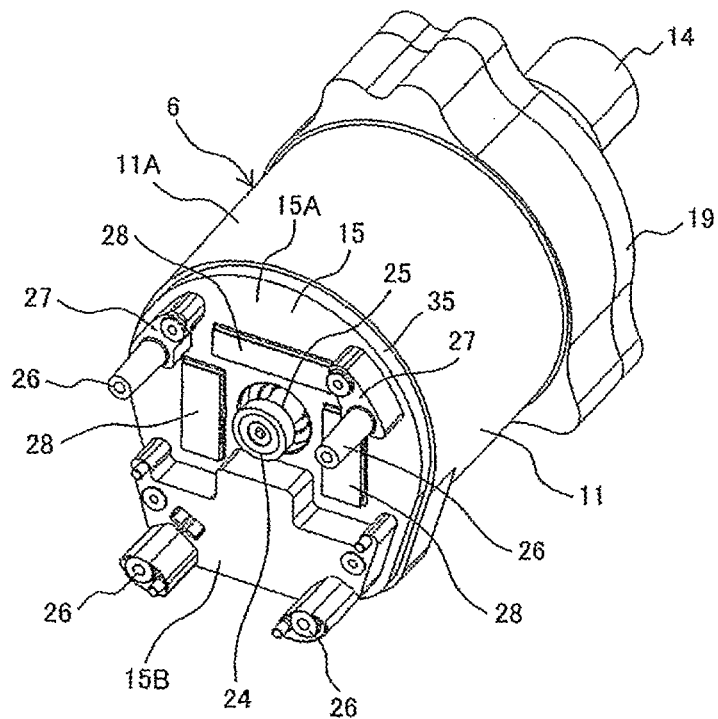
FIG. 4 is a perspective view of a motor housing shown in FIG. 3.
Figure 5:
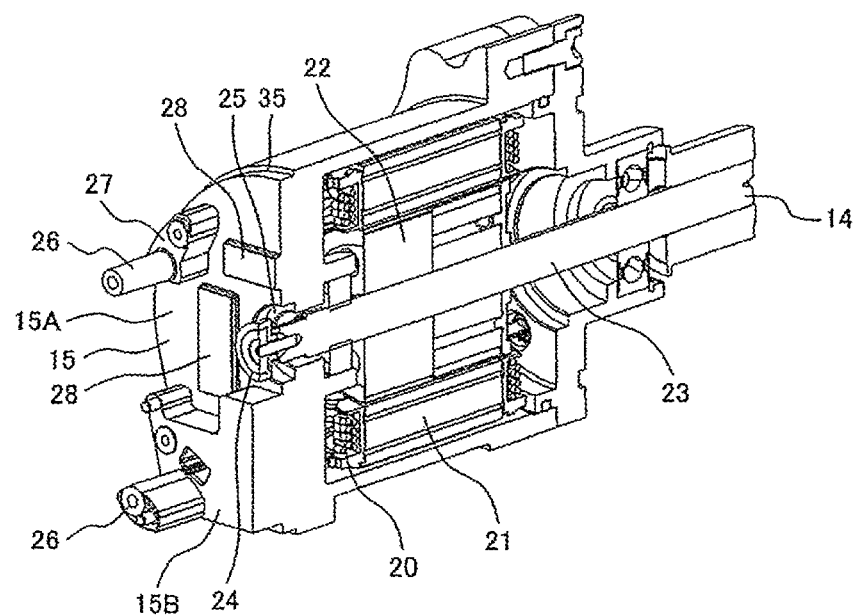
FIG. 5 is a cross section of the motor housing shown in FIG. 4, which is cut in an axial direction of the motor housing.

Next, structure or configuration of each component and an assembling method of the components will be explained with reference to FIGS. 4 to 9. FIG. 4 is an external view of the motor housing 11. FIG. 5 is a cross section of the motor housing 11, which is cut in an axial direction of the motor housing 11.

In FIGS. 4 and 5, the motor housing 11 is shaped into a cylindrical or tubular shape. The motor housing 11 has a side peripheral surface portion 11A, the end surface portion 15 that closes one end of the side peripheral surface portion 11A and an end surface portion 19 that closes the other end of the side peripheral surface portion 11A. In the present embodiment, the side peripheral surface portion 11A and the end surface portion 15 are formed integrally with each other, then the motor housing 11 has a bottomed cylindrical shape. The end surface portion 19 serves as a lid, and closes the other end of the side peripheral surface portion 11A after accommodating the electric motor in the side peripheral surface portion 11A.

Figure 9:
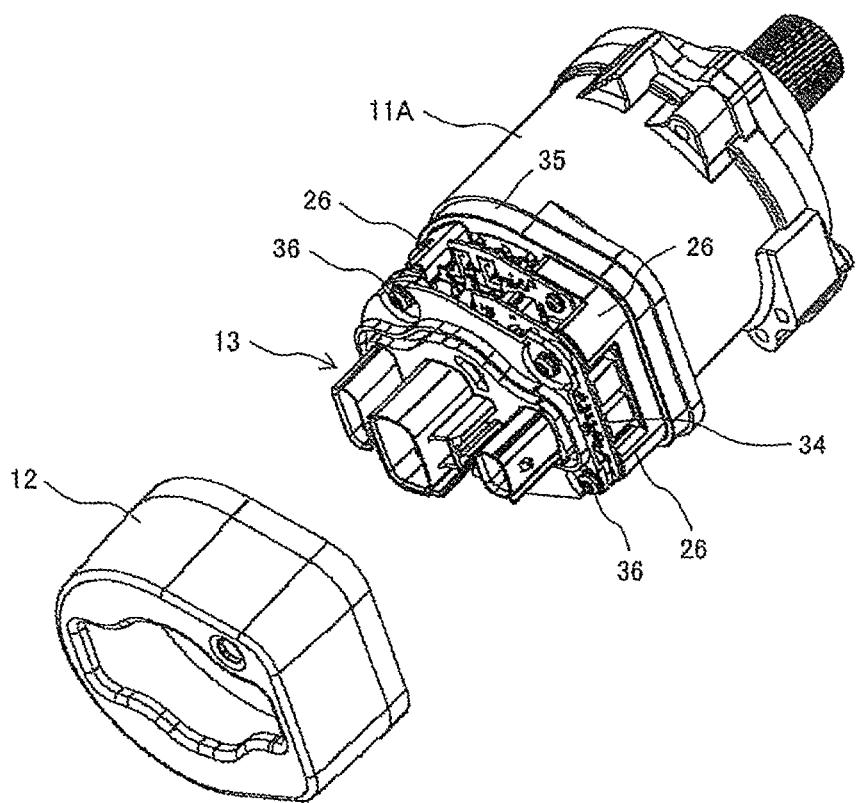
FIG. 9 is a perspective view of the motor housing shown in FIG. 8 with a connector terminal assembly further mounted on the motor housing.

An annular step portion (=the motor housing side annular engagement portion) 35 whose diameter is reduced inwards in a radial direction is formed at an outer circumferential surface of the end surface portion 15. Then, the opening end (=the metal cover side annular engagement portion) 37 of the metal cover 12 shown in FIG. 9 is engaged with this step portion 35. A fixing manner between the step portion 35 and the opening end 37 of the metal cover 12 is a fixing manner called the caulking or swaging fixation. This fixing manner will be explained later.

As shown in FIG. 5, a stator 21 having cores around which coils 20 are wound is fitted in the side peripheral surface portion 11A of the motor housing 11, and a rotor 22 in which a permanent magnet is embedded is rotatably accommodated inside this stator 21. A rotation shaft 23 is fixed to the rotor 22, and its one end is the output shaft portion 14, and its other end is a rotation detection portion 24 for detecting a rotation phase and a rotation speed of the rotation shaft 23. The rotation detection portion 24 is provided with a permanent magnet, and protrudes to the outside through a penetration hole 25 formed at the end surface portion 15. The rotation phase and the rotation speed of the rotation shaft 23 are detected by a magnetism detecting portion configured by a GMR element (not shown) etc.

Returning to FIG. 4, heat radiating sections (heat releasing sections) 15A and 15B for the power conversion circuit unit 16 (see FIG. 3) and the power supply circuit unit 17 (see FIG. 3) are formed on a surface of the end surface portion 15 located at an opposite side to the output shaft portion 14 of the rotation shaft 23. Further, board-connector fixing protrusions 26 are formed integrally with the end surface portion 15 at four corners of the end surface portion 15 so as to stand on or protrude from the surface of the end surface portion 15. Each board-connector fixing protrusion 26 has a screw hole inside the board-connector fixing protrusion 26. The board-connector fixing protrusion 26 is provided to secure an after-mentioned circuit board of the control circuit unit 18 and also the connector terminal assembly 13. The board-connector fixing protrusions 26 protruding from the power-conversion-circuit heat releasing section 15A (described later) each have a board receiving portion 27 whose height in the axial direction is the same as that of the power-supply-circuit heat releasing section 15B (described later). This board receiving portion 27 is a portion which an after-mentioned glass epoxy circuit board 31 of the power supply circuit unit 17 is mounted on and fixed to.

A plane area forming the end surface portion 15, which is orthogonal to the rotation shaft 23, is sectioned off into two sections. One is the power-conversion-circuit heat releasing section 15A to which the power conversion circuit unit 16 having the power switching element such as the MOSFET is fixed, and the other is the power-supply-circuit heat releasing section 15B to which the power supply circuit unit 17 is fixed. In the present embodiment, an area of the power-conversion-circuit heat releasing section 15A is greater than that of the power-supply-circuit heat releasing section 15B. This is because that the redundant system is employed as described above and a mounting area of the power conversion circuit unit 16 is secured.

And, a different height step in the axial direction (a direction in which the rotation shaft 23 extends) is provided between the power-conversion-circuit heat releasing section 15A and the power-supply-circuit heat releasing section 15B. That is, the power-supply-circuit heat releasing section 15B is formed so as to have a step that is away from the power-conversion-circuit heat releasing section 15A in the direction of the rotation shaft 23 of the electric motor. This step is set to such a height that the power conversion circuit unit 16 and the power supply circuit unit 17 do not interfere with each other when the power supply circuit unit 17 is mounted after the power conversion circuit unit 16 is mounted.

The power-conversion-circuit heat releasing section 15A is provided with three long narrow rectangular protruding heat releasing portions 28. These protruding heat releasing portions 28 are portions on which the power conversion circuit unit 16 for the redundant system is mounted. The protruding heat releasing portions 28 protrude from the surface of the power-conversion-circuit heat releasing section 15A in the direction of the rotation shaft 23 of the electric motor so as to be away from the electric motor.

The power-supply-circuit heat releasing section 15B is formed into a flat surface, and the power supply circuit unit 17 is mounted on the power-supply-circuit heat releasing section 15B. Therefore, the protruding heat releasing portion 28 acts as a heat releasing portion that releases and transmits heat generated at the power conversion circuit unit 16 to the end surface portion 15, and the power-supply-circuit heat releasing section 15B acts as a heat releasing portion that releases and transmits heat generated at the power supply circuit unit 17 to the end surface portion 15.

The protruding heat releasing portions 28 might be removed. In this case, the power-conversion-circuit heat releasing section 15A acts as the heat releasing portion that releases and transmits heat generated at the power conversion circuit unit 16 to the end surface portion 15. In the present embodiment, a metal board of the power conversion circuit unit 16 is welded to the protruding heat releasing portions 28 by frictional stir welding, which securely fixes the metal board to the protruding heat releasing portions 28.

As described above, in the present embodiment, a heat sink member is not needed at the end surface portion 15 of the motor housing 11, then a length in the axial direction can be shortened. Further, since the motor housing 11 has a sufficient heat capacity, it is possible to efficiently radiate or release heat of the power supply circuit unit 17 and the power conversion circuit unit 16 to the outside from the motor housing 11.

Figure 6:
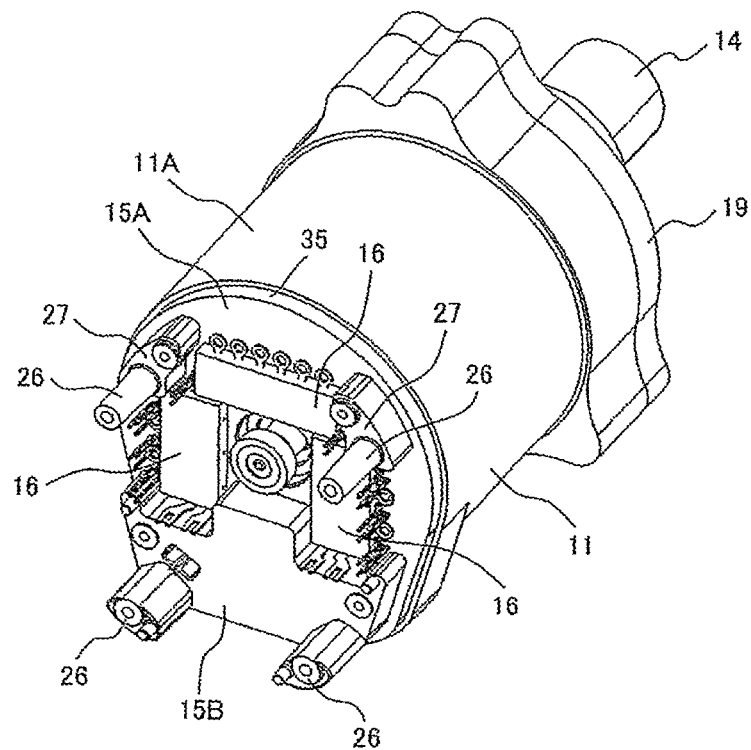
FIG. 6 is a perspective view of the motor housing shown in FIG. 4 with a power conversion circuit unit mounted on the motor housing.

Next, FIG. 6 shows a state in which the power conversion circuit unit 16 is mounted on the protruding heat releasing portions 28 (see FIG. 4). As shown in FIG. 6, the power conversion circuit unit 16 forming the redundant system is mounted on the protruding heat releasing portions 28 (see FIG. 4) formed on the power-conversion-circuit heat releasing section 15A. The switching element forming the power conversion circuit unit 16 is mounted on the metal board (using an aluminum-based metal), which is a good heat radiation configuration. The metal board is welded to the protruding heat releasing portions 28 by frictional stir welding.

Thus, the metal board of the power conversion circuit unit 16 is firmly fixed to the protruding heat releasing portions 28, and heat generated at the switching element can be efficiently transmitted to the protruding heat releasing portions 28. Heat transmitted to the protruding heat releasing portions 28 diffuses through the power-conversion-circuit heat releasing section 15A, and is further transmitted to the side peripheral surface portion 11A of the motor housing 11, then is released to the outside.

Here, as mentioned above, since a height of the power-conversion-circuit heat releasing section 15A in the axial direction is lower than that of the power-supply-circuit heat releasing section 15B, the power conversion circuit unit 16 does not interfere with the power supply circuit unit 17.

As described above, the power conversion circuit unit 16 is mounted on the protruding heat releasing portions 28 formed on the power-conversion-circuit heat releasing section 15A. Therefore, heat generated at the switching element of the power conversion circuit unit 16 can be efficiently transmitted to the protruding heat releasing portions 28. Heat transmitted to the protruding heat releasing portions 28 diffuses through the power-conversion-circuit heat releasing section 15A, and is further transmitted to the side peripheral surface portion 11A of the motor housing 11, then is released to the outside.

Figure 7:
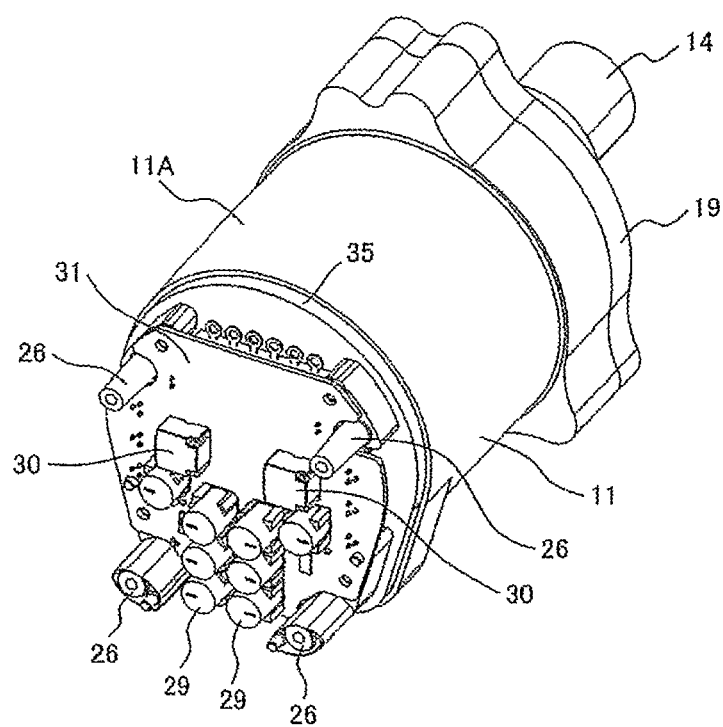
FIG. 7 is a perspective view of the motor housing shown in FIG. 6 with a power supply circuit unit further mounted on the motor housing.

Next, FIG. 7 shows a state in which the power supply circuit unit 17 is mounted above or over the power conversion circuit unit 16. As shown in FIG. 7, the power supply circuit unit 17 is mounted on the power-supply-circuit heat releasing section 15B. Capacitors 29 and coils 30 and so on which form the power supply circuit unit 17 are mounted on the glass epoxy circuit board 31. The power supply circuit unit 17 has the redundant system, and as can be seen from the drawings, power supply circuits configured by the capacitors 29 and the coils 30 etc., which are arranged symmetrically with respect to each other, are provided. The glass epoxy circuit board 31 mounts thereon the electric elements such as the capacitors, except the switching element of the power conversion circuit unit 16.

A surface at the power-supply-circuit heat releasing section 15B side (see FIG. 6) of this glass epoxy circuit board 31 is fixed to the end surface portion 15 so as to contact the power-supply-circuit heat releasing section 15B. As a fixing manner, as shown in FIG. 7, the glass epoxy circuit board 31 is fixed to the screw holes provided at the board receiving portions 27 of the board-connector fixing protrusions 26 with fixing screws (not shown), and also fixed to the screw holes provided at the power-supply-circuit heat releasing section 15B (see FIG. 6) with fixing screws (not shown).

Here, since the power supply circuit unit 17 is formed by the glass epoxy circuit board 31, the circuit units could be mounted on both sides of the glass epoxy circuit board 31. On the surface at the power-supply-circuit heat releasing section 15B side of the glass epoxy circuit board 31, the GMR element (not shown) or a rotation phase and rotation speed detection unit that is configured by a detection circuit formed by the GMR element is mounted, and detects the rotation phase and the rotation speed of the rotation shaft 23 (see FIG. 5) in cooperation with the rotation detection portion 24 (see FIG. 5) provided at the rotation shaft 23.

As described above, since the glass epoxy circuit board 31 is fixed to the end surface portion 15 so as to contact the power-supply-circuit heat releasing section 15B, it is possible to efficiently transmit heat generated at the power supply circuit unit 17 to the power-supply-circuit heat releasing section 15B. Heat transmitted to the power-supply-circuit heat releasing section 15B is further transmitted to and diffuses through the side peripheral surface portion 11A of the motor housing 11, then is released to the outside. Here, by interposing one of a good heat transfer adhesive (or a good thermal conductive adhesive), a heat transfer grease (or a thermal conductive grease) and a heat transfer sheet (or a thermal conductive sheet) between the glass epoxy circuit board 31 and the power-supply-circuit heat releasing section 15B, a heat transfer performance (or a thermal conductivity) can be further improved.

As described above, the power supply circuit unit 17 is mounted on the power-supply-circuit heat releasing section 15B. The surface at the power-supply-circuit heat releasing section 15B side of this glass epoxy circuit board 31 on which the circuit elements of the power supply circuit unit 17 are mounted is fixed to the end surface portion 15 so as to contact the power-supply-circuit heat releasing section 15B. It is therefore possible to efficiently transmit heat generated at the power supply circuit unit 17 to the power-supply-circuit heat releasing section 15B. Heat transmitted to the power-supply-circuit heat releasing section 15B is further transmitted to and diffuses through the side peripheral surface portion 11A of the motor housing 11, then is released to the outside.

Figure 8:
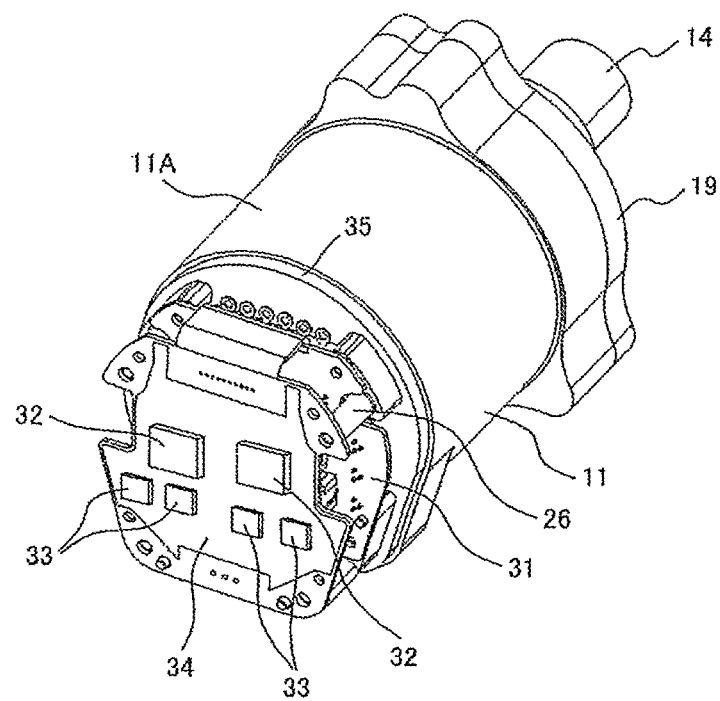
FIG. 8 is a perspective view of the motor housing shown in FIG. 7 with a control circuit unit further mounted on the motor housing.

Next, FIG. 8 shows a state in which the control circuit unit 18 is mounted above or over the power supply circuit unit 17. As shown in FIG. 8, the control circuit unit 18 is mounted above or over the power supply circuit unit 17. Microcomputers 32 and peripheral circuits 33 which form the control circuit unit 18 are mounted on the glass epoxy circuit board 34. The control circuit unit 18 also has the redundant system, and as can be seen from the drawings, control circuits configured by the microcomputers 32 and the peripheral circuits 33, which are arranged symmetrically with respect to each other, are provided. The microcomputers 32 and the peripheral circuits 33 could be mounted on a surface at the power supply circuit unit 17 side of the glass epoxy circuit board 34.

This glass epoxy circuit board 34 is fixed to the screw holes provided at tops of the board-connector fixing protrusions 26 (see FIG. 7) with fixing screws (not shown) so as to be sandwiched by the connector terminal assembly 13, as shown in FIG. 8, then a space in which the capacitors 29 and the coils 30 etc. of the power supply circuit unit 17 shown in FIG. 7 are arranged is provided between the glass epoxy circuit board 31 of the power supply circuit unit 17 and the glass epoxy circuit board 34 of the control circuit unit 18.

Next, FIG. 9 shows a state in which the connector terminal assembly 13 is mounted above or over the control circuit unit 18. As shown in FIG. 9, the connector terminal assembly 13 is mounted above or over the control circuit unit 18. The connector terminal assembly 13 is fixed to the screw holes provided at the tops of board-connector fixing protrusions 26 with fixing screws 36 so as to sandwich the control circuit unit 18 between the power supply circuit unit 17 and the connector terminal assembly 13. In this state, as shown in FIG. 3, the connector terminal assembly 13 is connected to the power conversion circuit unit 16, the power supply circuit unit 17 and the control circuit unit 18.

Further, after fixing the connector terminal assembly 13, the opening end 37 of the metal cover 12 is engaged with the step portion 35 of the motor housing 11, and fixed to the motor housing 11 at the fixing region FR provided in the outer circumferential direction by the caulking or swaging fixation. As mentioned above, the annular step portion 35 as the motor housing side annular engagement portion formed at the outer circumferential surface of the end surface portion 15 and the opening end 37 of the metal cover 12 as the metal cover side annular engagement portion are engaged with each other by fixation called a centering location engagement (or an exactly-fitting engagement) or a centering location fitting (or an exact fitting). However, a slight gap could be allowed between the annular step portion 35 as the motor housing side annular engagement portion and the opening end 37 as the metal cover side annular engagement portion. Next, the fixing region FR by the caulking or swaging fixation will be explained with reference to FIGS. 10 to 14.

FIG. 10 shows an outward appearance of the electric power steering device 6 with the motor housing 11 and the metal cover 12 fixed by the caulking or swaging fixation. FIG. 11 is a cross section, cut in the axial direction, of the electric power steering device 6 shown in FIG. 10.

The annular fixing region FR of the metal cover 12 is provided with a plurality of caulk-fixing portions (or a plurality of swage-fixing portions) 38. These caulk-fixing or swage-fixing portions 38 are formed by deformation of a wall surface of the metal cover 12 by pressing and squeezing, with a pressing tool, the wall surface of the metal cover 12 against and into caulking recessed portions (or swaging recessed portions) 40 formed by caulking grooves (or swaging grooves) or caulking holes (or swaging holes) that are formed at a fixing wall 39 extending from the annular step portion 35 formed at the end surface portion 15 of the motor housing 11 toward the connector terminal assembly 13 side in the axial direction.

Further, a space G (see FIG. 13) formed by and between the opening end 37 of the metal cover 12 and a wall surface extending from the annular step portion 35 to the fixing wall 39 is filled with a liquid sealant 41 to ensure liquid-tightness without any gap. Therefore, since a liquid-tightness sealing region SR is formed between the fixing region FR and the opening end 37 of the metal cover 12, salt water etc. are prevented from getting inside by and at the sealing region SR. Hence, since the saltwater etc. do not get in the caulk-fixing portions 38 of the fixing region FR, rust of the caulk-fixing portions 38 is suppressed, then mechanical reliability can be improved. In addition, since the salt water etc. are prevented from getting in the electronic control unit 9, electrical reliability can also be improved.

Next, a detailed structure of the caulk-fixing portion 38 shown in FIG. 3.1 will be explained with reference to FIGS. 12 to 14.

In FIGS. 12 and 13, the opening end 37 of the metal cover 12 is engaged with the step portion 35 formed at an outer circumferential end of the side peripheral surface portion 11A of the motor housing 11 by the exactly-fitting engagement so as to face each other. In this case, an outer peripheral shape, which forms the step portion 35, of the side peripheral surface portion 11A of the motor housing 11 and an outer peripheral shape of the opening end 37 of the metal cover 12 match up with each other. Thus, in an engagement state of these step portion 35 and opening end 37, an outer peripheral surface of the side peripheral surface portion 11A and an outer peripheral surface of the opening end 37 of the metal cover 12 are flush with each other, and the outer peripheral surface of the side peripheral surface portion 11A continues to the outer peripheral surface of the opening end 37 of the metal cover 12.

The caulking recessed portion 40 formed by the caulking groove or the caulking hole is provided at the fixing wall 39 extending from the step portion 35 toward the connector terminal assembly 13 side in the axial direction. Then, by pressing and squeezing the wall surface of the metal cover 12 against and into the caulking recessed portion 40 and deforming the wall surface of the metal cover 12 with the pressing tool, the caulk-fixing portion 38 is formed. Regarding the caulking recessed portion 40, it could be a seamless annular caulking groove formed on an outer peripheral wall surface of the fixing wall 39 or a caulking groove having a predetermined length in a circumferential direction. Instead, the caulking hole could be arranged at necessary positions on the outer peripheral wall surface of the fixing wall 39.

In the present embodiment, the caulking grooves each having the predetermined length in the circumferential direction are provided at necessary positions (three positions). Then, by the wall surface of the metal cover 12 pressed against and squeezed into these caulking recessed portions 40, movement of the metal cover 12 in a rotation direction and in an axial direction of the rotation shaft 23 with respect to the motor housing 11 is suppressed.

As shown in FIG. 14, a cross sectional shape, orthogonal to the axial direction, of the end surface portion 15 of the motor housing 11 is broadly formed by round sections 11R and a straight-line section 11S. Likewise, the opening end 37 of the metal cover 12 is formed so as to match up with this cross sectional shape. As shown by three bold arrows in the drawing, the caulk-fixing portions 38 are formed around the middle of the straight-line section 11S and at the round sections 11R located symmetrically with respect to an extending line LE that connects the middle of the straight-line section 11S and the rotation shaft 23.

Further, the space G formed throughout the entire circumference between an inner peripheral wall surface of the opening end 37 of the metal cover 12 and the wall surface extending from the annular step portion 35 to the fixing wall 39 is filled with the liquid sealant 41 to ensure liquid-tightness without any gap. When performing the caulking or swaging fixation, first, the liquid sealant 41 is applied, then the caulking or swaging fixation is performed. Therefore, the sealing region SR is formed at the opening end 37 side of the metal cover 12 when viewed from the caulk-fixing portion 38 provided at the fixing region FR.

If a thickness of the liquid sealant 41 is thin, the liquid sealant 41 might fall off. To prevent this fall-off, as shown in FIG. 13, an annular groove 39G that is recessed to an inner circumferential side is formed between the fixing wall 39 and the step portion 35, and after filling this annular, groove 39G with the liquid sealant 41, by pressing and squeezing the wall surface of the metal cover 12 against and into the caulking recessed portions 40 and deforming the wall surface of the metal cover 12, the caulking or swaging fixation is performed. With this, a sufficient thickness of the liquid sealant 41 is secured, then the fall-off of the liquid sealant 41 can be suppressed.

Further, the liquid sealant 41 is applied to butting surfaces of the opening end 37 of the metal cover 12 and the step portion 35 of the end surface portion 15 of the motor housing 11, to the outer peripheral surface of the opening end 37 of the metal cover 12 and to an outer peripheral surface of the step portion 35 of the end surface portion 15 of the motor housing 11. With this application of the liquid sealant 41, a liquid-tightness effect is further increased. In particular, on the outer peripheral surface of the opening end 37 of the metal cover 12 and at an exposed portion 41A of the liquid sealant 41 which is formed on the outer peripheral surface of the step portion 35 of the end surface portion 15 of the motor housing 11, since a slit formed by the butting surfaces of the opening end 37 of the metal cover 12 and the step portion 35 of the end surface portion 15 of the motor housing 11 is covered and filled with the liquid sealant 41, the salt water etc. can be effectively prevented from getting inside.

As the liquid sealant 41 to ensure liquid-tightness, synthetic resin having adhesiveness is used. In the present embodiment, an elastic silicon-based elastic adhesive is used. The elastic silicon-based elastic adhesive has properties of absorbing external vibrations and a stress by impact, which suppresses concentration of the stress on bonding interfaces. Therefore, although there is a risk that the liquid sealant 41 will fall off from the bonding interfaces then liquid-tightness performance will be lost for the electric power steering device that suffers from the vibrations and the impact, by using the elastic silicon-based elastic adhesive, the risk of losing the liquid-tightness performance can be reduced. In addition, in the present embodiment, since sealing is performed with the liquid sealant 41 having adhesiveness, an O-ring conventionally used for the liquid-tightness can be omitted. Therefore, there is no need to form an accommodating groove for accommodating the O-ring at the fixing wall 39, then increase in manufacturing cost can be suppressed.

The elastic silicon-based elastic adhesive (the liquid sealant) 41 could be replaced with a liquid gasket (FIPG: FORMED IN PLACE GASKET) having adhesive performance, and the liquid gasket made of room temperature hardening material or heat hardening material can be used. With this, the salt water can be prevented from getting inside from the engagement portion between the opening end 37 of the metal cover 12 and the end surface portion 15 of the motor housing 11.

Thus, since the salt water etc. are prevented from getting inside by and at the sealing region SR before reaching the fixing region FR, rust of the caulk-fixing portion 38 can be suppressed, and decrease in fixing force (fixing strength) to fix the metal cover 12 and the motor housing 11 is suppressed, then the mechanical reliability can be improved. Also, since the salt water etc. are prevented from getting in the electronic control unit 9, the electrical reliability can also be improved.

Further, since the metal cover 12 and the motor housing 11 are fixed by the caulking or swaging fixation without using the fixing screw, it is possible to reduce the outward appearance size and the weight. In addition, in a case where the O-ring is used, it is required to form the accommodating groove for accommodating the O-ring. However, in the present embodiment, since the O-ring is not used, no machining for the accommodating groove is required, and this can suppress increase in manufacturing cost.

Here, if a liquid sealant 41 having a high heat radiation performance, into which a good thermal conductive material such as alumina is mixed, is used, because of a large bonding area of the sealing region SR, heat of the power-conversion-circuit heat releasing section 15A and the power-supply-circuit heat releasing section 15B can be efficiently released to the metal cover 12. It is therefore possible to efficiently release heat from the electrical components forming the power supply circuit unit and the power conversion circuit unit to the outside, and the size reduction can be achieved.

In the present embodiment described above, as the fixing manner to fix the metal cover 12 and the motor housing 11 without using the fixing screw, the caulk-fixing portions 38 are provided at the three positions. However, the caulk-fixing portion(s) 38 could be formed throughout the entire circumference. In addition, instead of the caulking or swaging fixation, as a fixing manner without using the fixing screw, the opening end 37 of the metal cover 12 is press-fixed onto the fixing wall 39 of the step portion 35 of the motor housing 11, or the opening end 37 of the metal cover 12 is fixed to the fixing wall 39 of the step portion 35 of the motor housing 11 by shrink-fitting fixation.

Second Embodiment

Next, a second embodiment will be explained below. As a different point from the first embodiment, in the present embodiment, a coming-off prevention function is added to the caulk-fixing portion 38 shown in the first embodiment, Other structures or configurations of the present embodiment are the same as those of the first embodiment. Therefore, their redundant explanation will be omitted.

Figure 15:
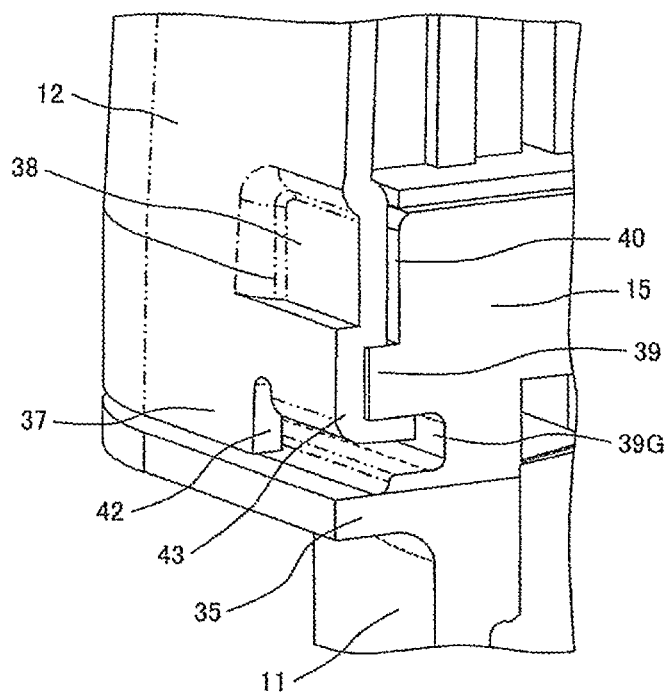
FIG. 15 is an enlarged sectional perspective view of the electric power steering device after a caulking or swaging fixation is performed, according to a second embodiment of the present invention.
Figure 16:
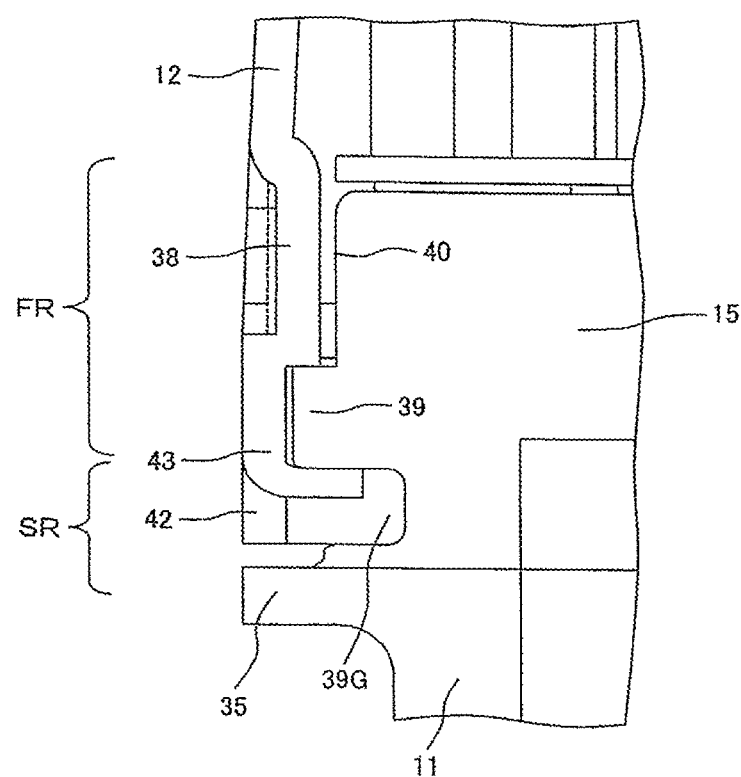
FIG. 16 is an enlarged sectional view of the electric power steering device shown in FIG. 15 after the caulking or swaging fixation is performed.

In FIGS. 15 and 16, at least two cutting portions 42 are formed at the opening end 37 of the metal cover 12 according to a length in the circumferential direction of the caulking recessed portion 40. The opening end 37 between these two cutting portions 42 becomes a bending portion 43, and this bending portion 43 is bent so as to hold the fixing wall 39 and engaged with the fixing wall 39 between the caulking recessed portion 40 and the annular groove 39G. That is, the bending portion 43 is engaged with a wall surface of the annular groove 39G by being bent. In this case, the caulk-fixing portion 38 and the bending portion 43 are formed at the same time by undergoing working or machining at once with the pressing tool. In the present embodiment, the bending portion 43 is provided according to the number of the caulking recessed portion 40.

Therefore, the metal cover 12 is fixed to the motor housing 11 more firmly by this bending portion 43. In addition, the coming-off prevention function that prevents the metal cover 12 from coming off in the axial direction is improved by the bending portion 43.

Here, in the second embodiment, the motor housing 11 and the end surface portion 15 are separately formed, and these motor housing 11 and end surface portion 15 are fixedly connected with fixing bolts or by welding. However, in the same manner as the first embodiment, the motor housing 11 and the end surface portion 15 could be formed integrally with each other.

Further, in the present embodiment, the bending portion 43 is formed at the opening end 37 of the metal cover 12 according to the length in the circumferential direction of the caulking recessed portion 40 by the two cutting portions 42. However, the bending portion 43 is not limited to this. Regardless of a forming position of the caulking recessed portion 40, the arbitrary number of the bending portion 43 could be formed at arbitrary positions at the opening end 37 of the metal cover 12.

Also in the present embodiment, in the same manner as the first embodiment, since the salt water etc. are prevented from getting inside by and at the sealing region SR before reaching the fixing region FR, rust of the caulk-fixing portion 38 can be suppressed, and decrease in fixing force (fixing strength) to fix the metal cover 12 and the motor housing 11 is suppressed, then the mechanical reliability can be improved. Also, since the salt water etc. are prevented from getting in the electronic control unit 9, the electrical reliability can also be improved.

Further, since the metal cover 12 and the motor housing 11 are fixed by the caulking or swaging fixation without using the fixing screw, it is possible to reduce the outward appearance size and the weight. In addition, in a case where the O-ring is used, it is required to form the accommodating groove for accommodating the O-ring. However, in the present embodiment, since the O-ring is not used, no machining for the accommodating groove is required, and this can suppress increase in manufacturing cost.

Third Embodiment

Next, a third embodiment will be explained below. As a different point from the first embodiment, in the present embodiment, instead of the caulk-fixing portion 38 shown in the first embodiment, the metal cover 12 and the motor housing 11 are fixed by press-fitting or shrink-fitting. Other structures or configurations of the present embodiment are the same as those of the first embodiment. Therefore, their redundant explanation will be omitted.

Figure 17:
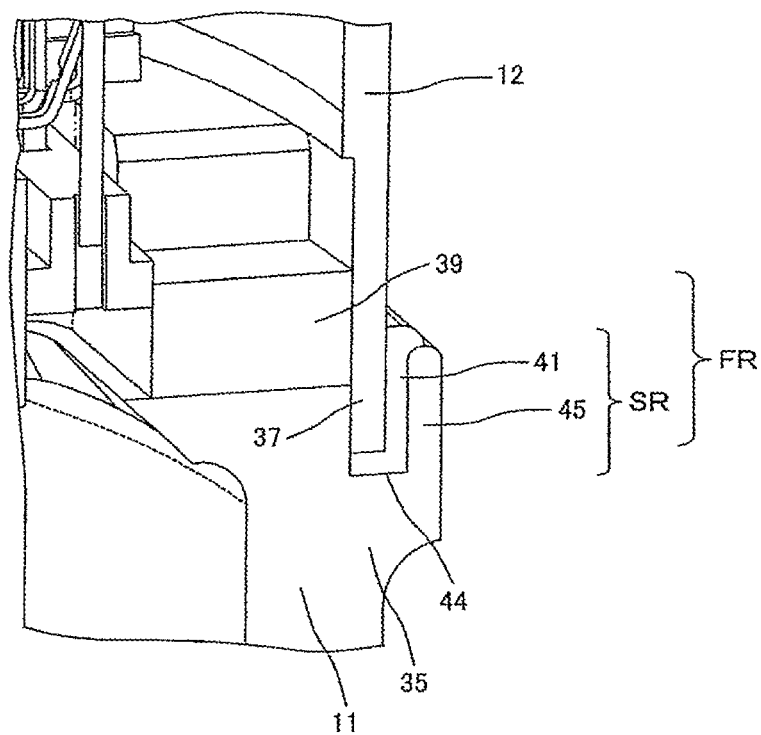
FIG. 17 is an enlarged sectional perspective view of the electric power steering device after a shrink-fitting fixation is performed, according to a third embodiment of the present invention.

In FIG. 17, an annular accommodating groove 44 is formed at an outer circumferential side of the step portion 35 of the motor housing 11, and a side wall 45 is formed at an outer circumferential side of the accommodating groove 44. The opening end 37 of the metal cover 12 is firmly fixed to the wall surface of the fixing wall 39 and an inner circumferential side wall surface of the accommodating groove 44 by press-fitting or shrink-fitting. The opening end 37 of the metal cover 12 is accommodated in the accommodating groove 44, and the liquid sealant 41 fills the accommodating groove 44 so as to encircle the opening end 37 from outside.

Here, also in the third embodiment, the motor housing 11 and the end surface portion 15 are separately formed, and these motor housing 11 and end surface portion 15 are fixedly connected with fixing bolts or by welding. However, in the same manner as the first embodiment, the motor housing 11 and the end surface portion 15 could be formed integrally with each other.

Also in the present embodiment, in the same manner as the first embodiment, since the salt water etc. are prevented from getting inside by and at the sealing region SR before reaching the fixing region FR, rust of the caulk-fixing portion 38 can be suppressed, and decrease in fixing force (fixing strength) to fix the metal cover 12 and the motor housing 11 is suppressed, then the mechanical reliability can be improved. Also, since the salt water etc. are prevented from getting in the electronic control unit 9, the electrical reliability can also be improved.

Further, since the metal cover 12 and the motor housing 11 are fixed by the caulking or swaging fixation without using the fixing screw, it is possible to reduce the outward appearance size and the weight. In addition, in a case where the O-ring is used, it is required to form the accommodating groove for accommodating the O-ring. However, in the present embodiment, since the O-ring is not used, no machining for the accommodating groove is required, and this can suppress increase in manufacturing cost.

As described above, the present invention has the motor housing side annular engagement portion formed on the outer circumferential surface of the end surface portion of the metal-made motor housing which is the opposite side to the output shaft portion of the rotation shaft of the electric motor; and the metal cover side annular engagement portion formed at the opening end of the metal cover that covers the electronic control unit configured to control the electric motor and engaged with the motor housing side annular engagement portion. And, the fixing region is formed by fixing the metal cover side annular engagement portion to the motor housing side annular engagement portion in the fixing manner without using any fixing screw in a state in which the metal cover side annular engagement portion is engaged with the motor housing side annular engagement portion, and the sealing region is formed between the fixing region and the opening end of the metal cover with a liquid sealant applied between the fixing region and the opening end of the metal cover.

According to this configuration, since the sealing region is formed between the fixing region and the opening end of the metal cover with the liquid sealant applied between the fixing region and the opening end of the metal cover, salt water etc. are prevented from getting in the fixing region, then mechanical and electrical reliability can be improved. Further, since the fixing screw is not used, it is possible to reduce an outward appearance size and a weight.

The present invention is not limited to the above embodiment, and includes all design modifications. The above embodiment is an embodiment that is explained in detail to easily understand the present invention, and the present invention is not necessarily limited to the embodiment having all elements or components described above. Further, a part of the configuration of the embodiment can be replaced with a configuration of other embodiments. Also, the configuration of other embodiments could be added to the configuration of the embodiment. Moreover, regarding a part of the configuration of the embodiment, the configuration of other embodiments could be added, removed and replaced.

The invention claimed is:

1. An electric drive device comprising:
a motor housing accommodating therein an electric motor that drives a mechanical control element;
an electronic control unit provided at an end surface portion side of the motor housing which is an opposite side to an output shaft portion of a rotation shaft of the electric motor and having a control circuit unit, a power supply circuit unit and a power conversion circuit unit that are configured to drive the electric motor;
a cover covering the electronic control unit;
a motor housing side annular engagement portion is formed on an outer circumferential surface of the end surface portion of the motor housing which is the opposite side to the output shaft portion of the rotation shaft of the electric motor; and
a cover side annular engagement portion that is an inner circumferential wall of the cover located at an opening end side of the cover and that is engaged with the motor housing side annular engagement portion, wherein
a fixing region where the cover side annular engagement portion is fixed to the motor housing side annular engagement portion in a fixing manner in a state in which the cover side annular engagement portion is engaged with the motor housing side annular engagement portion is formed, the fixing manner being such that the inner circumferential wall of the cover side annular engagement portion and the motor housing side annular engagement portion are fixed without use of any fixing screw and without penetration of the cover side annular engagement portion between an outer circumferential wall and the inner circumferential wall of the cover side annular engagement portion at the fixing region, and
a sealing region, where liquid sealant is applied, is formed at the opening end side of the cover with respect to the fixing region.

2. The electric drive device as claimed in claim 1, wherein:
the fixing region is formed by pressing and squeezing a wall surface of the cover side annular engagement portion against and into a caulking recessed portion that is formed at the motor housing side annular engagement portion and caulking the wall surface of the metal cover side annular engagement portion.

3. The electric drive device as claimed in claim 2, wherein:
the caulking recessed portion provided at the motor housing side annular engagement portion is formed on an entire circumferential surface of the motor housing side annular engagement portion, or a plurality of caulking recessed portions are formed at predetermined positions on the circumferential surface of the motor housing side annular engagement portion.

4. The electric drive device as claimed in claim 2, wherein:
a space formed at the sealing region in the state in which the cover side annular engagement portion is engaged with the motor housing side annular engagement portion is filled with the liquid sealant.

5. The electric drive device as claimed in claim 4, wherein:
an annular groove that is recessed to an inner circumferential side is formed on the circumferential surface, located at an opening end side of the cover when viewed from the caulking recessed portion, of the motor housing side annular engagement portion, and
the annular groove is filled with the liquid sealant.

6. The electric drive device as claimed in claim 5, wherein:
at least one bending portion is formed at the opening end of the cover by at least two cutting portions, and the at least one bending portion is engaged with a wall surface of the annular groove by being bent.

7. The electric drive device as claimed in claim 6, wherein:
the at least one bending portion further includes a plurality of bending portions provided at the opening end of the cover, the plurality of bending portions being formed at positions corresponding to the caulking recessed portions formed at the predetermined positions on the circumferential surface of the motor housing side annular engagement portion.

8. The electric drive device as claimed in claim 1, wherein:
the fixing region is formed by press-fitting or shrink-fitting the cover side annular engagement portion to the motor housing side annular engagement portion.

9. The electric drive device as claimed in claim 8, wherein:
an accommodating groove that accommodates therein the opening end of the cover is formed at the motor housing side annular engagement portion,
the opening end of the cover is accommodated in the accommodating groove, and
the liquid sealant fills the accommodating groove so as to encircle the opening end from outside.

10. An electric power steering device comprising:
an electric motor providing a steering assistive force to a steering shaft on the basis of an output from a torque sensor that detects a turning direction and a turning torque of the steering shaft;
a motor housing accommodating therein the electric motor;
an electronic control unit provided at an end surface portion side of the motor housing which is an opposite side to an output shaft portion of a rotation shaft of the electric motor and having a control circuit unit, a power supply circuit unit and a power conversion circuit unit that are configured to drive the electric motor; and
a cover covering the electronic control unit;
a motor housing side annular engagement portion is formed on an outer circumferential surface of the end surface portion of the motor housing which is the opposite side to the output shaft portion of the rotation shaft of the electric motor; and
a cover side annular engagement portion that is an inner circumferential wall of the cover located at an opening end side of the cover and that is engaged with the motor housing side annular engagement portion, wherein a fixing region where the cover side annular engagement portion is fixed to the motor housing side annular engagement portion in a fixing manner in a state in which the cover side annular engagement portion is engaged with the motor housing side annular engagement portion is formed, the fixing manner being such that the inner circumferential wall of the cover side annular engagement portion and the motor housing side annular engagement portion are fixed without use of any fixing screw and without penetration of the cover side annular engagement portion between an outer circumferential wall and the inner circumferential wall of the cover side annular engagement portion at the fixing region, and
a sealing region, where a liquid sealant is applied, is formed at the opening end side of the cover with a liquid sealant with respect to the fixing region.

11. The electric power steering device as claimed in claim 10, wherein:
the fixing region is formed by pressing and squeezing a wall surface of the cover side annular engagement portion against and into a caulking recessed portion that is formed at the motor housing side annular engagement portion and caulking the wall surface of the cover side annular engagement portion.

12. The electric power steering device as claimed in claim 11, wherein:
the caulking recessed portion provided at the motor housing side annular engagement portion is formed on an entire circumferential surface of the motor housing side annular engagement portion, or a plurality of caulking recessed portions are formed at predetermined positions on the circumferential surface of the motor housing side annular engagement portion.

13. The electric power steering device as claimed in claim 11, wherein:
a space formed at the sealing region in the state in which the cover side annular engagement portion is engaged with the motor housing side annular engagement portion is filled with the liquid sealant.

14. The electric power steering device as claimed in claim 13, wherein:
an annular groove that is recessed to an inner circumferential side is formed on the circumferential surface, located at an opening end side of the cover when viewed from the caulking recessed portion, of the motor housing side annular engagement portion, and
the annular groove is filled with the liquid sealant.

15. The electric power steering device as claimed in claim 14, wherein:
at least one bending portion is formed at the opening end of the cover by at least two cutting portions, and the at least one bending portion is engaged with a wall surface of the annular groove by being bent.

16. The electric power steering device as claimed in claim 15, wherein:
the at least one bending portion further includes a plurality of bending portions provided at the opening end of the cover, the plurality of bending portions being formed at positions corresponding to the caulking recessed portions formed at the predetermined positions on the circumferential surface of the motor housing side annular engagement portion.

17. The electric power steering device as claimed in claim 10, wherein:

the fixing region is formed by press-fitting or shrink-fitting the cover side annular engagement portion to the motor housing side annular engagement portion.

18. The electric power steering device as claimed in claim 17, wherein:
an accommodating groove that accommodates therein the opening end of the cover is formed at the motor housing side annular engagement portion,
the opening end of the cover is accommodated in the accommodating groove, and
the liquid sealant fills the accommodating groove so as to encircle the opening end from outside.

\* \* \* \* \*